(12) United States Patent
Abdel-Rahman et al.

(10) Patent No.: US 9,669,833 B2
(45) Date of Patent: Jun. 6, 2017

(54) METHOD AND SYSTEM FOR OPERATING ADAPTIVE CRUISE CONTROL SYSTEM

(71) Applicant: GM GLOBAL TECHNOLOGY OPERATIONS LLC, Detroit, MI (US)

(72) Inventors: Akram M. Abdel-Rahman, Pickering (CA); Shiv Patel, Brampton (CA); Ephraim C. Yuen, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 33 days.

(21) Appl. No.: 14/804,842

(22) Filed: Jul. 21, 2015

(65) Prior Publication Data

US 2017/0021833 A1 Jan. 26, 2017

(51) Int. Cl.
*B60W 30/165* (2012.01)

(52) U.S. Cl.
CPC ....... *B60W 30/165* (2013.01); *B60W 2550/20* (2013.01)

(58) Field of Classification Search
CPC ................ B60W 30/165; B60W 2550/20
See application file for complete search history.

(56) References Cited

U.S. PATENT DOCUMENTS

| | | | | |
|---|---|---|---|---|
| 7,102,496 B1* | 9/2006 | Ernst, Jr. | ............... | G08G 1/164 180/167 |
| 7,613,553 B1* | 11/2009 | Benjamin | ............ | G08G 5/0069 700/250 |
| 7,634,331 B2* | 12/2009 | Kuge | ................... | B60W 40/09 701/1 |
| 7,689,039 B2* | 3/2010 | Watabe | .............. | G06K 9/00805 382/181 |
| 8,688,312 B2* | 4/2014 | Kondoh | ................ | B60W 40/09 340/576 |
| 8,751,563 B1* | 6/2014 | Warden | .................. | G06Q 10/06 370/328 |
| 8,965,685 B1* | 2/2015 | Denaro | .............. | G01C 21/3697 340/438 |
| 9,141,112 B1* | 9/2015 | Loo | ...................... | G05D 1/0293 |
| 2005/0015184 A1* | 1/2005 | Michi | ................... | B60W 30/16 701/1 |
| 2005/0084156 A1* | 4/2005 | Das | ...................... | G06K 9/3241 382/224 |
| 2005/0088318 A1* | 4/2005 | Liu | ........................ | G08G 1/161 340/902 |
| 2006/0095195 A1* | 5/2006 | Nishimura | .......... | B60W 30/025 701/96 |
| 2006/0220913 A1* | 10/2006 | Krautter | ................. | G01C 21/26 340/933 |

(Continued)

OTHER PUBLICATIONS

William Strunk Jr. and E.B. White, The Elements of Style, 3rd Edition, 1979, all pages.*

*Primary Examiner* — Calvin Cheung
(74) *Attorney, Agent, or Firm* — Reising Ethington, P.C.

(57) ABSTRACT

A system and method are provided for operating an adaptive cruise control system of a host vehicle. The method includes receiving data measured from a plurality of sensors, wherein the measured data relates to one or more target vehicles in the host vehicle's field of view. The method further includes generating a following score for each target vehicle based on the measured data and controlling the host vehicle response based on the following score.

20 Claims, 3 Drawing Sheets

(56) References Cited

U.S. PATENT DOCUMENTS

| | | | | |
|---|---|---|---|---|
| 2007/0257804 | A1* | 11/2007 | Gunderson | G07C 5/0891 340/576 |
| 2008/0069400 | A1* | 3/2008 | Zhu | G06K 9/3241 382/103 |
| 2010/0063725 | A1* | 3/2010 | Miura | G01C 21/26 701/408 |
| 2010/0328644 | A1* | 12/2010 | Lu | G01S 7/4802 356/5.01 |
| 2011/0320492 | A1* | 12/2011 | Inghelbrecht | G06Q 50/30 707/776 |
| 2012/0310504 | A1* | 12/2012 | DuHadway | G01C 21/28 701/93 |
| 2013/0173111 | A1* | 7/2013 | Syed | B60W 50/14 701/36 |
| 2013/0219294 | A1* | 8/2013 | Goldman-Shenhar | G06F 3/0484 715/751 |
| 2014/0278027 | A1* | 9/2014 | Burke | G08G 1/22 701/117 |
| 2015/0039350 | A1* | 2/2015 | Martin | G06Q 30/0261 705/4 |
| 2016/0004924 | A1* | 1/2016 | Gao | G06K 9/00785 382/103 |
| 2016/0110650 | A1* | 4/2016 | Basir | B60W 40/09 706/14 |
| 2017/0053534 | A1* | 2/2017 | Lokesh | B60W 30/165 |
| 2017/0057507 | A1* | 3/2017 | Gordon | B60W 30/16 |

* cited by examiner

METHOD AND SYSTEM FOR OPERATING ADAPTIVE CRUISE CONTROL SYSTEM

FIELD

The present invention generally relates to cruise control systems for vehicles and, more particularly, to cruise control systems that adapt to the driving characteristics of surrounding vehicles.

BACKGROUND

An adaptive cruise control system—sometimes called an autonomous, active or intelligent cruise control system—is similar to a traditional cruise control, but uses additional sensing equipment to detect other objects, e.g., a target vehicle in front of and in the same lane as the user's vehicle. For example, when a user sets a vehicle speed to 60 miles per hour ("mph") under control of the adaptive cruise control system, and the vehicle approaches a slower-moving target vehicle in the same driving lane, the adaptive cruise control system causes the vehicle to slow down. The adaptive cruise control system uses throttle and brake controls to first reduce the speed of the host vehicle. Then, the adaptive cruise control system controls the speed of the host vehicle to maintain a particular distance between the host vehicle and the target vehicle. The particular distance is based on user selection, sensed weather conditions, sensed road conditions, and other factors. The adaptive cruise control system controls the speed of the host vehicle to be at the lesser of 1) the speed necessary to maintain the particular distance and 2) the user-set speed. However, when the target vehicle is driving erratically (e.g., frequent braking and speed fluctuations), the host vehicle begins to mimic the bad driving behavior by continually decelerating and accelerating, which can lead to an undesirable driving experience.

SUMMARY

According to one embodiment, there is provided a system and method for operating an adaptive cruise control system of a host vehicle. The method includes receiving data measured from a plurality of sensors, wherein the measured data relates to one or more target vehicles in the host vehicle's field of view. The method further includes generating a following score for each target vehicle based on the measured data and controlling the host vehicle response based on the following score.

According to another embodiment, there is provided a control system for a vehicle. The system includes a plurality of vehicle sensors configured to measure data relating to one or more target vehicles in the host vehicle's field of view and a control module configured to receive the measured data relating to each target vehicle, generate a following score for each target vehicle based on the measured data, and control the host vehicle response based on the following score.

DRAWINGS

Preferred exemplary embodiments will hereinafter be described in conjunction with the appended drawings, wherein like designations denote like elements, and wherein.

Figure 3:
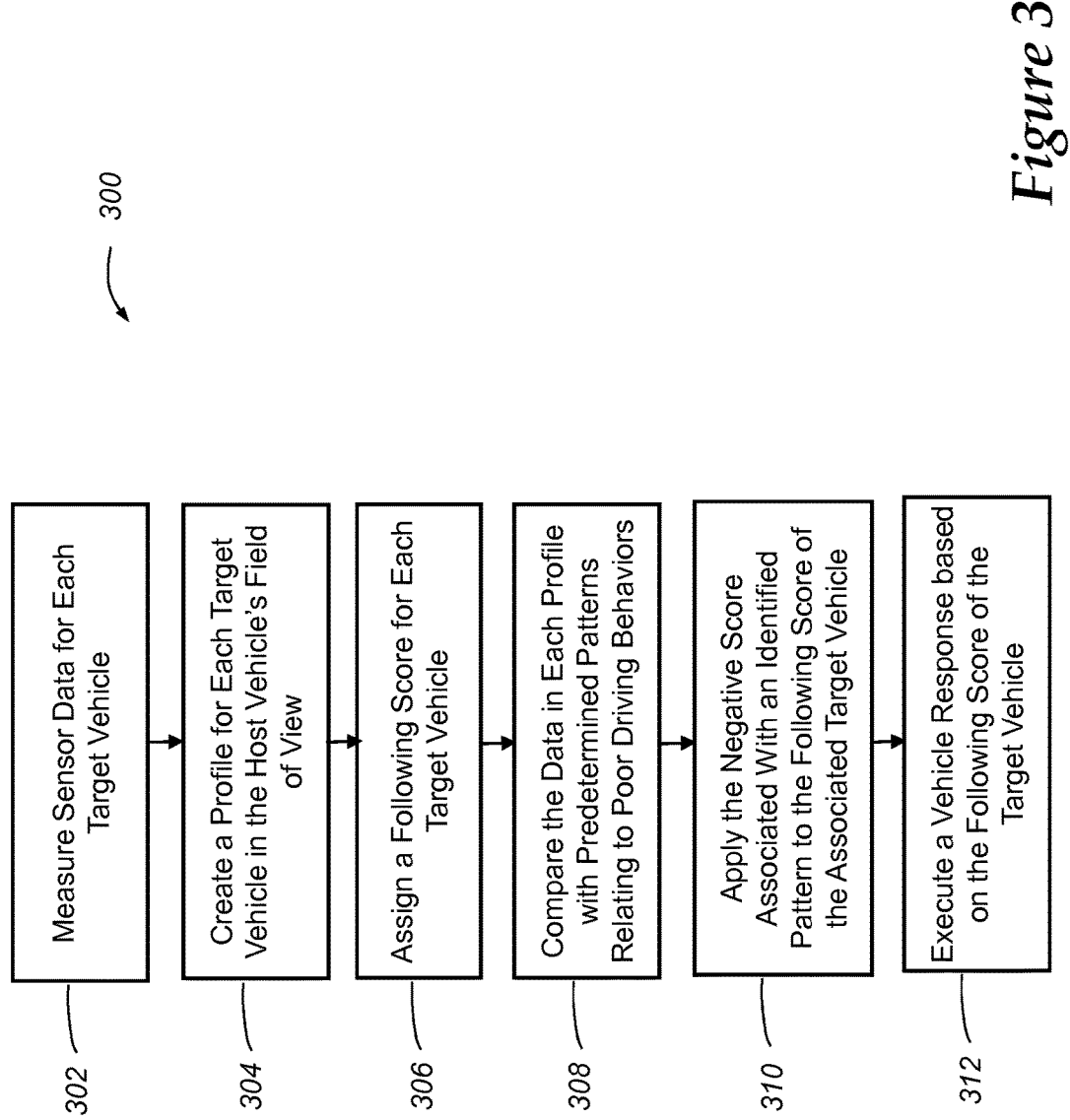

FIG. 3 a flow chart illustrating an exemplary embodiment of the method disclosed herein.

DESCRIPTION

The system and method described below are directed to an adaptive cruise control system having intelligent autonomous driving controls. The system employs an algorithm that generates a following score based on the behavior of target vehicles in the field of view of a host vehicle. The following score is a metric that is based on measured parameters using on-board vehicle sensors and distinguishes between normal and poor target vehicle driving behaviors. The following score can be a quantitative or qualitative score, similar to a grade or rating, and is representative of the driving behavior of a particular target vehicle. Based on the following score for each target vehicle, the operational settings for the adaptive cruise control system are adjusted to compensate for the driving behavior of one or more target vehicles in the host vehicle's field of view.

System—

Figure 1:
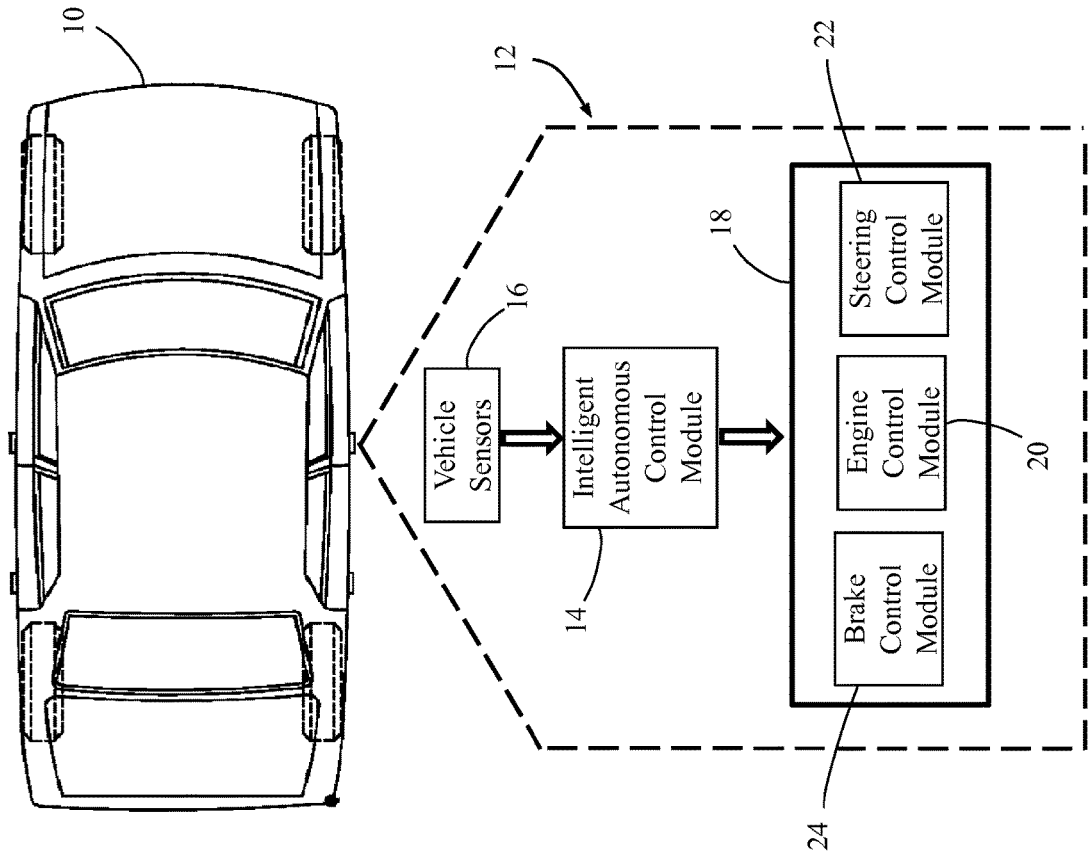
FIG. 1 is a block diagram depicting an embodiment of a communications system that is capable of utilizing the method disclosed herein.
Figure 2:
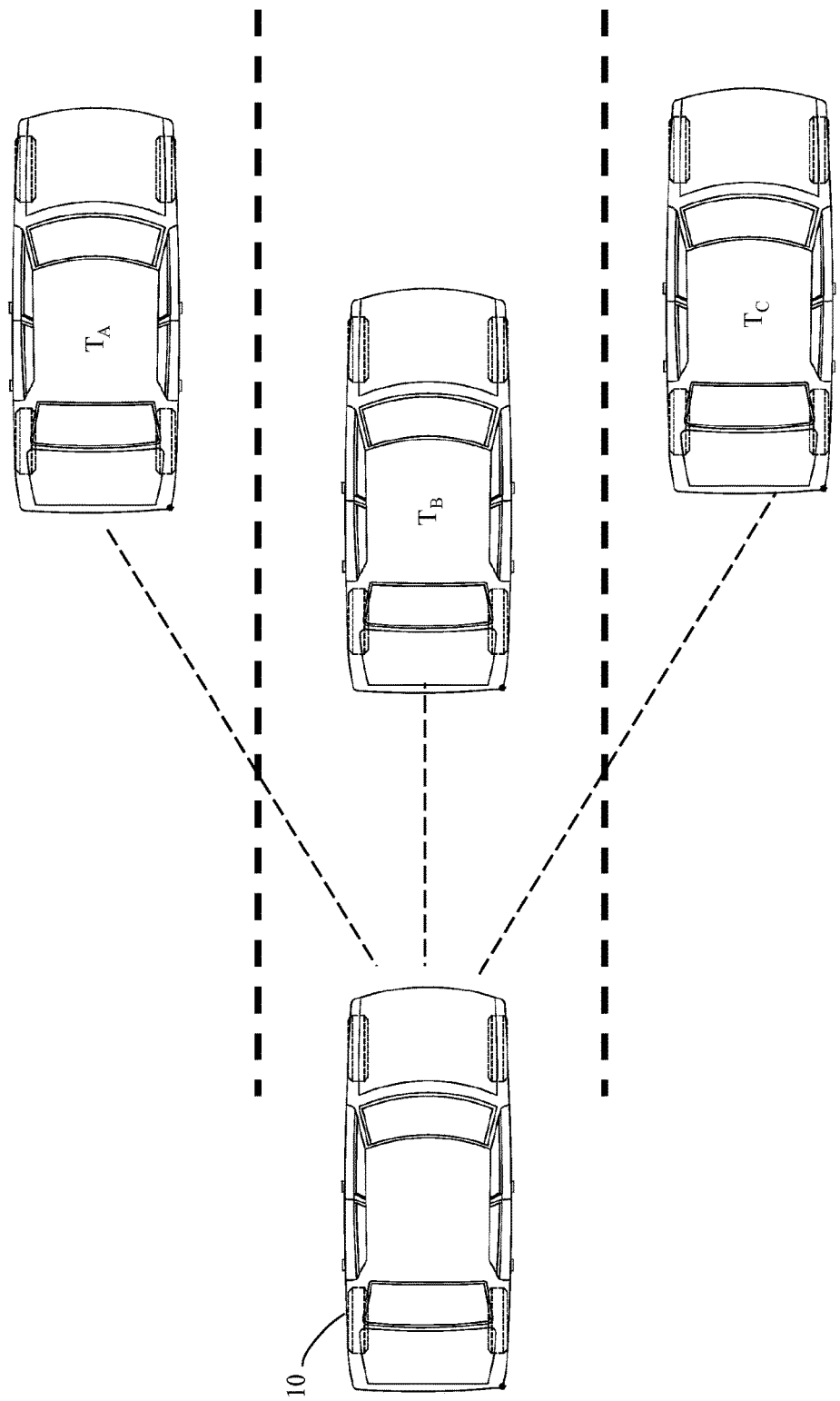
FIG. 2 illustrates a host vehicle in relation to three target vehicles.

With reference to FIGS. 1 and 2, there is shown a schematic view of an exemplary embodiment of a host vehicle 10 having a communications system 12 that includes an adaptive cruise control (ACC) system having an intelligent autonomous control (IAC) module 14 configured to autonomously or automatically compensate for the driving behavior of one or more target vehicles within the host vehicle's field of view. Host vehicle 10 is depicted in the illustrated embodiment as a passenger car, but it should be appreciated that any other vehicle including motorcycles, trucks, sports utility vehicles (SUVs), recreational vehicles (RVs), semi trucks, etc. can also be used. System 12 may also include any number of different hardware components and other devices, including various types of sensors 16 and a plurality of vehicle control modules 18 such as an engine control module 20, a steering control module 22, and a brake control module 24.

Sensors 16 may include, without limitation, vehicle mounted sensors that are used to scan, examine, evaluate, etc. an area in front of and off to the side of the host vehicle 10. According to the non-limiting example in FIG. 1, vehicle mounted sensors 16 include different types of cameras, and can be mounted in any suitable forward looking position and orientation. Sensors 16 also include forward-looking object detection sensors to monitor the surrounding environment. These sensors include, without limitation, RADAR systems, LIDAR systems, near-field sensing systems, camera and video-recognition systems, or any other type of sensing system capable of performing the functions described. In one embodiment, sensors 16 detect objects in front of the host vehicle 10, such as target vehicles $T_A$, $T_B$, and $T_C$, and can detect objects to the sides and rear as well. Accordingly, sensors 16 may comprise a variety of sub-components distributed throughout the vehicle 10 to perform the described functions. FIG. 2 illustrates an arrangement wherein there are three target vehicles within the field of view of the host vehicle. One of ordinary skill in the art understands that the number of target vehicles shown is exemplary and limited to three for purposes of explanation. However, the system disclosed herein has the capability to monitor any number of vehicles within the host vehicle's field of view.

In addition to detecting the presence of an object, sensors 16 can determine the speed of target vehicles $T_A$, $T_B$, and $T_C$, either objectively or relative to the host vehicle 10, and can determine the distance between the host vehicle 10 and the target vehicles $T_A$, $T_B$, and $T_C$. Together with the speed of the target vehicles $T_A$, $T_B$, and $T_C$ relative to the host vehicle 10, the system can then determine a time gap between the vehicle 10 and the target vehicles $T_A$, $T_B$, and $T_C$. The time gap is the estimated amount of time between the rear of a traveling object ahead of the host vehicle 10 and the front of the host vehicle 10, assuming current vehicle speeds. Thus, a time gap of five seconds indicates that if the traveling object were to pass a particular position on the road, five seconds after the rear of the object was at the position, the front of the vehicle 10 would reach the position. For each target vehicle, sensors 16 may also determine the driving lane relevant to the host vehicle 10, longitudinal and lateral ranges and range rates (i.e., rate at which the longitudinal and lateral ranges are changing), turning and brake light behavior, and speed relevant to surrounding traffic and road speed.

In certain embodiments, the sensors 16 are part of a module and can perform both sensing and calculation operations internally, while others can provide information and readings to other components of the vehicle 10, including the IAC module 14. In such embodiments, the IAC 14, or other component(s) can perform operations to determine the time gap and other aspects of range information independently. Additional sensors may be used to further evaluate the area surrounding the host vehicle 10, including areas on the side and behind the host vehicle. Other known sensors and sensing techniques may be used in addition to or in lieu of those described above, as the present system and method are not limited to any particular sensor type.

IAC module 14 may communicate with sensors 16, vehicle control modules 18, and/or any other components, devices, modules, systems, etc. on the host vehicle 10, and it may be used to carry out some, most, or even all of the electronic instructions or steps that help make up the present method described herein. The IAC module 14 can be any type of device capable of processing electronic instructions and may include one or more processing devices that include processors, microprocessors, microcontrollers, host processors, controllers, vehicle communication processors, and application specific integrated circuits (ASICs), to name a few possibilities. The IAC module 14 can execute various types of digitally-stored instructions, such as software or firmware programs stored in a memory device, which enables the control of various vehicle functions.

Depending on the particular embodiment, the IAC module 14 may be a stand-alone electronic controller (e.g., a pre-packaged sensor controller that incorporates both sensors and controller into a single package, an object detection controller, a safety controller, etc.), may be incorporated or included within another vehicle electronic module (e.g., automated driving control module, active safety control module, brake control module, steering control module, engine control module, etc.), or may be part of a larger network or system (e.g., automated driving system, lane departure warning system, active safety system, traction control system (TCS), electronic stability control (ESC) system, antilock brake system (ABS), etc.), to name a few possibilities. Accordingly, the IAC module 14 is not limited to any one particular embodiment or arrangement and may be used by the present method to detect and/or track target vehicles within the host vehicle's field of view.

In one embodiment, the IAC module 14 captures or gathers data measured from sensors 16 for each target vehicle $T_A$, $T_B$, and $T_C$, and stores that data into separate accounts. Data and information from other sensors and devices located throughout the vehicle may be used as well. Each account, also referred to as a profile, maintains a buffer consisting of data collected over a predetermined period of time (e.g., 300 seconds), as long as the target vehicle(s) stays in the host vehicle's field of view. The account or profile, or just a portion thereof, can be implemented or maintained in the form of an electronic data structure, as is understood in the art. Vehicles in the host vehicle's field of view are considered target vehicles and may be given a following score upon detection in the host vehicle's field of view. According to one potential embodiment, each target vehicle $T_A$, $T_B$, and $T_C$ is initially assigned the maximum possible following score. For example, if the following score range is 100-0, wherein 100 reflects the best possible driving behavior and 0 reflects the worst possible driving behavior in terms of the desirability of following that target vehicle while using an automated cruise control system, each target vehicle may begin with a maximum possible following score of 100. Other embodiments may be used where the initial following score is an intermediate score (e.g., 50), a minimum possible score, or some other default or starting value.

The IAC module 14 may include a set of predetermined saved patterns that represent or correspond to good, bad driving behaviors. These patterns are programmed and stored in the IAC module 14 and may be inferred or determined based on the measured data. The bad driving behaviors include, for example, frequent and/or regular hard accelerations and decelerations, inconsistent speeds, sudden lane changes made with/without turn signals, speed conditions inconsistent with speed limits, lane departures, etc. Each of the predetermined stored patterns may be assigned a negative score value, which is commensurate with the perceived severity or nature of the bad driving behavior. For example, the least severe driving pattern $P_1$ may have a score of −10, while the most severe driving pattern $P_N$ may have a score of −80. One of ordinary skill in the art understands that the scale and ranges provided herein are exemplary and may be vary without departing from the scope of the disclosed method. Other techniques for "weighting" the scores may be applied.

The IAC module 14 is configured to compare each of the target vehicles profiles to the stored patterns, to perform other driving behavior analysis, or some combination thereof. In one particular embodiment, the patterns are compared to the accumulated measured data collected in each target vehicle's profile buffer. The comparison between the buffer and the stored patterns may begin immediately upon detection of the target vehicle within the sensor's field of view. The time in which it takes to detect a particular pattern depends on the underlying behavior. For example, some bad or undesirable driving behavior may be determined based on very little measured data, while others may require more data in order to identify and confirm a particular pattern. The comparison may be achieved in any number of pattern detection, recognition and/or other ways known to those of skill in the art. In one embodiment, the predetermined saved patterns are stored in a database in the form of a single or multi-dimensional data structure such as a look-up table or array. Once the IAC module 14 detects a match between the measured data (i.e., the actual driving behavior) and the saved patterns, deductions to the following score can be made according to the identified saved driving patterns and their corresponding scores. In other words, the target vehicle's overall following score is reduced by the negative score associated with the identified pattern. The following score for each target vehicle is continually updated. The IAC module 14 continuously buffers the measured data and compares the data to the saved patterns. Therefore, there may be an immediate response to vehicle behavior in the host vehicle's field of view.

In one embodiment, a target vehicle's following score may be adjusted such that a low following score is increased over time. For example, a following score may be incrementally increased if there is an absence of bad driving behavior for a predetermined period of time (e.g., 5 minutes) or if good or desirable driving behavior is detected.

Traditionally, an IAC module 14 includes a calibration file, which is a setup file that defines the commands given to the actuating vehicle control modules such as the engine control module 20, the steering control module 22, and the brake control module 24. The commands may help govern the adaptive cruise control system and can include acceleration and deceleration values and are dependent upon input parameters such as the host vehicle speed, target vehicle speed, target vehicle range and range rate, weather and road conditions, etc. The calibration file may also determine a weight of the input parameters to determine the output parameters or commands. In traditional adaptive cruise control systems, there is one calibration file that governs the behavior of the host vehicle (i.e., acceleration and deceleration values) in response to the behavior of the target vehicle. The disclosed adaptive cruise control system, however, implements intelligent autonomous driving controls wherein the IAC module 14 may include a plurality of responses and/or calibration files that are selected based on the driving behavior of the target vehicles. More specifically, the IAC module 14 is configured with predefined responses and calibration settings based on the target vehicle's following score.

For example, there may be predetermined calibration settings for normal, moderate, and conservative driving behaviors. In addition, there may also be calibration settings directed to various types of following scores or driving patterns such as a smooth following calibration for times when a traffic jam is detected based on the stop and go behavior of the target vehicles, or a decoupling calibration setting for when a target vehicle in the same lane is driving with hard accelerations and decelerations. Another calibration setting may relate to a time gap adjustment wherein the time gap varies as a function of time or speed rather than being a constant. For example, in a scenario in which the time gap is 1 second, the time gap may respond as a function of some variable rather than a constant such that when the vehicle is starting out during a period of high acceleration, the time gap may be temporary set to 1.5 seconds until a certain speed wherein the time gap can be more easily maintained. The same principal may apply to following scores, such that the time gap or some other adaptive cruise control parameter is a function of a following score and correspondingly changes as the following score changes. Each of the predefined responses and calibration settings may be ranked from the most subtle response to the most significant response.

In one embodiment, the remedial actions implemented by the IAC module 14 are implemented according to following score thresholds. For example, there may be a following score threshold associated with a lane change suggestion and another threshold associated with making an autonomous lane change. In other words, there may be a threshold following score associated with each of the predefined responses and calibration settings.

Method—

FIG. 3 illustrates a method 300 for controlling an adaptive cruise control system having intelligent autonomous driving controls. At step 302, data is measured from a plurality of vehicle sensors 16. The sensors 16 gather data relating to target vehicles $T_A$, $T_B$, and $T_C$ that are in the host vehicle's 10 field of view. Data is gathered and stored in a buffer that is designated for each target vehicle. The data is accumulated in the buffer as long as the target vehicle remains in the host vehicle's field of view. The sensors 16 are configured to detect a variety of parameters including a driving lane of each target vehicle relative to the host vehicle, longitudinal and lateral ranges and range rates between the host vehicle and each target vehicle, the frequency of turning and brake lights for each target vehicle, and the speed of each target vehicle relative to surrounding traffic and road speed. Other vehicle data (e.g., host vehicle speed and acceleration, etc.) may be gathered as well.

At step 304, a profile is created for each target vehicle in the host vehicle's field of view. At step 306 a following score is initially assigned to each target vehicle profile. In one embodiment, the assigned following score is equal to the maximum driving score (e.g., 100), which represents a vehicle that is being properly driven in terms of an ideal target vehicle to follow using an adaptive cruise control system.

At step 308 the IAC module 14 compares the data measured by sensors 16 in each profile, and more particularly with the data in each profile buffer, with predetermined saved patterns relating to poor driving behaviors. If a correlation is detected between the measured data and any of the predetermined patterns, at step 310 the negative score associated with the identified patterns is applied to the following score of the associated target vehicle. Each time a correlation is identified; the associated following score is updated and decreased by the value of that particular identified pattern. As previously mentioned, the following score can be increased during this step when good driving behavior or desirable driving patterns are detected.

In addition to predetermined patterns for bad driving behavior, the IAC module 14 stores predefined responses based on the following scores. The responses can be in the form of calibration settings that are tailored or customized to the particular identified behavior. The responses are designed to optimize the host vehicle driving experience in terms of comfort and safety. At step 312, the IAC module 14 executes the corresponding response by transmitting command signals to vehicle control modules 18 such as an engine control module 20, a steering control module 22, and a brake control module 24. The responses include, without limitation, adjustments to the acceleration and deceleration settings, following distance calibration, lane change requests, and open lane change speed settings. It is even possible for the method to compare the following scores of two or more target vehicles and take appropriate actions (e.g., execute an automated lane change) or make recommendations to the driver based on the outcome of that comparison.

In a different embodiment where the following score is qualitative in nature, the method may begin by assigning a default qualitative following score to each of the target vehicles in the host vehicle's field of view. Consider the example where there are several possible qualitative following scores (e.g., best, good, normal, poor, worst, etc.), then the highest or most ideal qualitative score (best in the example above) may be initially assigned to each target vehicle. Each time a negative or undesirable driving pattern is detected, then the qualitative following score may be accordingly reduced for that particular target vehicle, such as by lowering the score one or more qualitative levels depending on the severity and nature of the detected driving behavior. Some undesirable driving patterns may only lead to a qualitative reduction of one level or increment, while other more egregious driving behaviors may lead to a multi-level reduction. Other embodiments are certainly possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating an adaptive cruise control system of a host vehicle, the method comprising the steps of:
   receiving data measured from a plurality of sensors, wherein the measured data relates to one or more target vehicles in the host vehicle's field of view;
   generating a following score for each of the one or more target vehicles based on the measured data, wherein the following score represents the driving behavior of a particular target vehicle and indicates a desirability of the host vehicle to follow that target vehicle in a host vehicle equipped with an adaptive cruise control system; and
   controlling a host vehicle response based on the following score.

2. The method of claim 1, wherein the plurality of sensors are forward-looking vehicle-mounted sensors configured to detect one or more of: a driving lane of each target vehicle relative to the host vehicle, longitudinal or lateral ranges and range rates between the host vehicle and each target vehicle, frequency of turning and brake lights for each target vehicle, and speed of each target vehicle relative to surrounding traffic or posted speed limit.

3. The method of claim 1, further comprising collecting and storing data from the plurality of sensors for a predetermined period of time in a profile buffer.

4. The method of claim 1, further comprising creating a profile for the one or more target vehicles in the host vehicle's field of view.

5. The method of claim 1, further comprising comparing the measured data for the one or more target vehicles to predetermined patterns associated with certain types of driving behaviors.

6. The method of claim 5, further comprising reducing a target vehicle's following score if a correlation is identified between the measured data for that particular target vehicle and the predetermined patterns associated with undesirable driving behavior.

7. The method of claim 6, wherein the target vehicle's following score is quantitative and is reduced by a value assigned to the identified predetermined pattern associated with undesirable driving behavior.

8. The method of claim 6, wherein the target vehicle's following score is qualitative and is reduced by an increment assigned to the identified predetermined pattern associated with undesirable driving behavior.

9. The method of claim 6, wherein the following score is initially assigned an ideal score and each predetermined pattern has a negative score that is applied to the following score once the predetermined pattern of bad driving behavior has been identified.

10. The method of claim 1, wherein controlling the host vehicle response based on the following score includes initiating a predefined response, calibration setting, or both based on the following score.

11. The method of claim 10, wherein the host vehicle response includes increasing the time gap between the host vehicle and the target vehicle based on the following score.

12. The method of claim 10, wherein the host vehicle response includes suggesting a lane change to the host vehicle driver or autonomously performing a lane change.

13. The method of claim 10, wherein each of the predefined responses and calibration settings are ranked from the most subtle response to the most significant response.

14. The method of claim 10, wherein the calibration settings include at least one of: a normal following setting; a moderate following setting; a conservative following setting; a following acceleration and deceleration calibration; a following distance calibration, and open lane speed settings.

15. The method of claim 1, wherein controlling the host vehicle response based on the following score includes selecting a vehicle response from a plurality of predefined responses, calibration settings, or both.

16. The method of claim 15, wherein the vehicle response is selected using a lookup table.

17. The method of claim 1, further comprising associating a following score threshold with each of the predefined responses, calibration settings, or both.

18. A control system for a vehicle, the system comprising:
   a plurality of vehicle sensors configured to measure data relating to one or more target vehicles in the host vehicle's field of view;
   an adaptive cruise control system configured to:
      receive the measured data relating to the one or more target vehicle;
      generate a following score for the one or more target vehicles based on the measured data, wherein the following score represents the driving behavior of a particular target vehicle and indicates a desirability of the host vehicle to follow that target vehicle in a host vehicle equipped with an adaptive cruise control system; and
      control the host vehicle response based on the following score.

19. The system of claim 18, wherein controlling the host vehicle response based on the following score includes initiating a predefined response, calibration setting, or both based on the following score.

20. The system of claim 18, wherein the adaptive cruise control system is further configured to:
   compare the measured data for the one or more target vehicles to predetermined patterns associated with undesirable driving behaviors; and
   reduce a target vehicle's following score if a correlation is identified between the measured data for that particular target vehicle and the predetermined patterns.

* * * * *